United States Patent [19]
Porter

[11] 3,909,233
[45] Sept. 30, 1975

[54] METHOD FOR INCREASING THE SUCROSE CONTENT OF GROWING PLANTS

[75] Inventor: Clark A. Porter, Kirkwood, Mo.

[73] Assignee: Monsanto Company, St. Louis, Mo.

[22] Filed: Mar. 4, 1974

[21] Appl. No.: 447,706

[52] U.S. Cl. ................................................. 71/86
[51] Int. Cl.² ........................................ A01N 9/36
[58] Field of Search ............................... 71/76, 86

[56] References Cited
UNITED STATES PATENTS

| | | | |
|---|---|---|---|
| 3,288,846 | 11/1966 | Irani et al. | 260/502.5 |
| 3,556,762 | 1/1971 | Hamm | 71/76 |
| 3,799,758 | 3/1974 | Franz | 71/86 |

*Primary Examiner*—James O. Thomas, Jr.
*Attorney, Agent, or Firm*—Arnold H. Cole

[57] ABSTRACT

The sucrose content of sugar cane plants is increased by treating the plants, prior to harvest, with an alkylaminodi(methylphosphonic acid) or salts thereof.

9 Claims, No Drawings

METHOD FOR INCREASING THE SUCROSE CONTENT OF GROWING PLANTS

This invention relates to a method for increasing the sucrose content of growing plants. More particularly, this invention is concerned with a method wherein sugar cane plants are subjected to a chemical treatment which serves to increase the amount of harvestable sucrose in said plants.

It has now been found that certain alkylaminodi (methylphosphonic acids), and salts thereof, when applied to sugar producing plants in the manner hereinafter described, serve to increase the amount of recoverable sucrose in such plants. It is believed that this desirable effect results from an action of the acid to reduce or retard further vegetative growth of the treated plant. Thus, the reducing sugars which are stored in the plant are not used as energy for plant growth but are rather converted to recoverable sucrose.

The particular chemical compounds employed in treating sugar cane plants are those wherein the alkyl group on the nitrogen atom has either one or two carbon atoms, and said alkyl group can also have a chlorine atom thereon. Such compounds can be effectively used as free acids, and they can alternatively be employed as alkali metal, ammonium or lower alkylamine salts of said acids.

The active ingredients of this invention can be readily prepared from the reaction of an appropriate alkylamine or ammonia with formaldehyde and orthophosphorous acid. Proportions of reactants, catalysts and reaction conditions are described in detail in U.S. Pat. Nos. 3,288,846 and 3,459,793.

In determining the appropriate rates and times of application to sugar cane plants, it is necessary to consider both the chronological age of the plant and its stage of maturity since cane, depending upon the practice in different geographical areas, is grown from 9 to about 30 months before harvest. Application at a rate of from about 0.1 to 5.0 pounds per acre can be made from about 2 to 8 weeks prior to the projected harvest date. Preferably, such applications are made from 3 to 7 weeks before said date.

An active ingredient of this invention can be conveniently applied to the plants as an aqueous solution or suspension. Said active ingredient can, of course, be in its free acid form, or it may be employed in the form of an alkali metal or amine salt in order to improve such desirable features as solubility or stability. For example, a liquid composition may be applied from a boom-spray, or a solid dust composition where the active component is diluted with an inert solid such as clay can be flown on the plants from an aircraft. Suitable liquid compositions include surfactants such as those enumerated in U.S. Pat. Nos. 3,224,865 and 3,245,775. Preferred surface active agents which are convenient to use in liquid compositions of this invention are of the non-ionic type such as alkyl phenoxy poly (ethyleneoxy) ethanols, polyethylene oxide adducts of fatty and resin acids, and long chain alkyl mercaptan adducts with ethylene oxide.

A particularly preferred carrier for the acids or salts of this invention is water with about 0.1 to 2.0% by weight of surfactant added thereto. Alternatively, the aqueous carrier can be replaced by a non-toxic mineral oil as such, or as an oil-in-water or water-in-oil emulsion. It has been found convenient to apply the compositions to the plants in the form of aqueous solutions, suspensions or emulsions, the dilution being such that a spray volume of from about 7 to 20 gallons of liquid per acre will contain the desired dosage of active ingredient. It will be recognized, however, that higher or lower total spray volumes can be beneficially employed depending upon the particular dispensing apparatus and other factors well understood by those skilled in the art.

The specific examples which follow are presented as illustrative, non-limiting demonstrations of the useful and unexpected properties of the acids and salts of this invention.

EXAMPLE I 0.5 Gram of methylaminodi (methylphosphonic acid) is dissolved in 4 ml. water that contains as a surfactant about 0.25% (w./w.) nonylphenol which was ethoxylated to contain about 10.5 mols. of ethylene oxide per mol. of nonylphenol ("Tergitol NPX"). 0.6 ml. of this solution is deposited or dropped by means of a syringe with a fine needle on the spindle area at the top of the last visible dewlap of each of 20 stalks of sugar cane aged 19 months. (A dewlap is the junction between the blade of the leaf and the sheath which clasps the stalk). Ten of these stalks were harvested 4 weeks after such treatment and 10 more were harvested 5 weeks after such treatment.

The top 15 joints of the treated cane as well as those of similar untreated cane are removed, combined and analyzed in terms of juice purity and pol percent cane, following the so-called "press method" developed by T. Tanimoto, Hawaiian Planters Record, 57, 133 (1964). "Pol percent cane" is a polarmetric determination and equals the percentage of sucrose if the latter is the only substance in the solution which will rotate the plane of polarized light. In any event, determination of the pol percent cane is a standard and effective method for determining the sucrose content of sugar cane. The results are given below:

|  | FOUR WEEKS | | FIVE WEEKS | |
|---|---|---|---|---|
|  | Juice Purity | Pol% Cane | Juice Purity | Pol% Cane |
| Control (untreated) | 77.88 | 9.77 | 77.75 | 9.28 |
| Treated | 80.50 | 10.01 | 78.86 | 9.69 |

These results clearly show an improvement in both sucrose yield and juice purity of the treated plants.

EXAMPLE II

The procedures described in the preceding example are repeated on another variety of sugar cane plants of about 20 months of age with the following results:

|  | FOUR WEEKS | | FIVE WEEKS | |
|---|---|---|---|---|
|  | Juice Purity | Pol% Cane | Juice Purity | Pol% Cane |
| Control (untreated) | 78.34 | 9.73 | 77.94 | 9.79 |
| Treated | 85.38 | 12.56 | 81.43 | 10.80 |

The treated plants clearly demonstrate a substantial gain in both of the factors measured.

3

EXAMPLE III

The procedures described in the preceding examples are repeated on still another variety of sugar cane plants of about 22.75 months of age with the following results:

|  | FOUR WEEKS | | FIVE WEEKS | |
|---|---|---|---|---|
|  | Juice Purity | Pol% Cane | Juice Purity | Pol% Cane |
| Control (untreated) | 66.73 | 7.57 | 71.86 | 7.56 |
| Treated | 72.94 | 9.13 | 70.79 | 7.73 |

Although juice purity of the treated plants was slightly below the control at 5 weeks, all other data shows significant improvements in the treated plants.

This same variety of sugar cane plants was also treated when the plants were about 23.5 months of age with the following results:

|  | FOUR WEEKS | | FIVE WEEKS | |
|---|---|---|---|---|
|  | Juice Purity | Pol% Cane | Juice Purity | Pol% Cane |
| Control (untreated) | 67.90 | 7.52 | 67.37 | 7.41 |
| Treated | 69.49 | 7.82 | 65.29 | 7.02 |

Desirable improvements were again noted at 4 weeks although decreases were observed at the later measurements on this variety of older plants.

EXAMPLE IV

The procedures described above are repeated on the same variety of cane employed in Example III. Here, however, the sugar cane plants are about 16 months of age, and the active ingredient applied is 2-chloroethylaminodi (methylphosphonic acid).

|  | FOUR WEEKS | | FIVE WEEKS | |
|---|---|---|---|---|
|  | Juice Purity | Pol% Cane | Juice Purity | Pol% Cane |
| Control (untreated) | 58.50 | 5.91 | 53.74 | 5.00 |
| Treated | 64.72 | 6.64 | 58.51 | 6.03 |

The treated plants clearly demonstrate a substantial gain in both of the factors measured at each observation date.

Results similar to those described in the preceding examples are also obtained with other and different active ingredients of this invention including the monosodium salt of methylaminodi (methylphosphonic acid), the dipotassium salt of methylaminodi (methylphosphonic acid), the ammonium salt of methylaminodi (methylphosphonic acid), the isopropylamine salt of methylaminodi (methylphosphonic acid) and ethylaminodi(methylphosphonic acid).

Although the invention has been described herein with respect to specific embodiments, the details thereof are not to be construed as limitations except to the extent defined in the following claims.

What is claimed is:

1. A method for increasing the sucrose content of sugar cane plants which comprises applying to said plants, from about 2 to 8 weeks prior to harvest, an effective amount of a compound of the formula $$R - N - (CH_2PO_3H_2)_2$$

wherein R represents methyl, ethyl, chloromethyl or chloroethyl, or an alkali metal, ammonium or lower alkylamine salt thereof.

2. A method as defined in claim 1 wherein application is at a rate of from about 0.1 to 5.0 pounds per acre.

3. A method as defined in claim 1 wherein application is made from about 3 to 7 weeks prior to harvest.

4. A method as defined in claim 2 wherein application is made from about 3 to 7 weeks prior to harvest.

5. A method as defined in claim 1 wherein the compound is methylaminodi(methylphosphonic acid).

6. A method as defined in claim 1 wherein the compound is ethylaminodi(methylphosphonic acid).

7. A method as defined in claim 1 wherein the compound is 2-chlorethylaminodi(methylphosphonic acid).

8. A method as defined in claim 1 wherein the compound is alkali metal salt.

9. A method as defined in claim 1 wherein the compound is an ammonium or lower alkylamine salt.

* * * * *